(12) United States Patent
Polewarczyk et al.

(10) Patent No.: US 10,343,724 B2
(45) Date of Patent: Jul. 9, 2019

(54) SYSTEM AND METHOD FOR FABRICATING STRUCTURES

(71) Applicant: GM GLOBAL TECHNOLOGY OPERATIONS LLC, Detroit, MI (US)

(72) Inventors: Joseph M. Polewarczyk, Rochester Hills, MI (US); Paul J. Wolcott, Macomb, MI (US); Justin C. Martin, Ferndale, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 15/612,111

(22) Filed: Jun. 2, 2017

(65) Prior Publication Data

US 2018/0346037 A1 Dec. 6, 2018

(51) Int. Cl.
| | |
|---|---|
| *B62D 25/20* | (2006.01) |
| *B62D 29/00* | (2006.01) |
| *B33Y 10/00* | (2015.01) |
| *B33Y 80/00* | (2015.01) |
| *B22F 7/08* | (2006.01) |
| *B21D 53/88* | (2006.01) |
| *B23P 15/00* | (2006.01) |

(52) U.S. Cl.
CPC .............. *B62D 25/20* (2013.01); *B21D 53/88* (2013.01); *B22F 7/08* (2013.01); *B23P 15/00* (2013.01); *B33Y 10/00* (2014.12); *B33Y 80/00* (2014.12); *B62D 29/007* (2013.01)

(58) Field of Classification Search
CPC .......................... B62D 25/20; B62D 25/2009; B62D 25/2036; B62D 25/2045; B62D 29/004; B62D 29/007; B33Y 80/00; B33Y 10/00
See application file for complete search history.

(56) References Cited

U.S. PATENT DOCUMENTS

| | | | | |
|---|---|---|---|---|
| 2015/0343887 A1* | 12/2015 | Bojanowski | ............. | B60J 7/022 296/213 |
| 2017/0050677 A1* | 2/2017 | Czinger | ................. | B62D 21/17 |
| 2017/0137067 A1* | 5/2017 | Wolf | ....................... | B62D 25/02 |
| 2018/0251163 A1* | 9/2018 | Martin | .................. | B29C 64/153 |
| 2018/0257713 A1* | 9/2018 | Faruque | ................ | B62D 21/157 |
| 2018/0333924 A1* | 11/2018 | Modzel | ............... | B29C 67/0092 |
| 2018/0339456 A1* | 11/2018 | Czinger | ................. | B33Y 10/00 |
| 2018/0346037 A1* | 12/2018 | Polewarczyk | ......... | B62D 25/20 |

\* cited by examiner

*Primary Examiner* — Gregory A Blankenship
(74) *Attorney, Agent, or Firm* — Quinn IP Law

(57) ABSTRACT

A system and method for fabricating a vehicle structure includes a first portion and a second portion having a body cooperating with the first portion using an additive manufacturing process. The body of the second portion includes one or more projections extending from the body. A third portion includes at least one opening and operatively engages the one or more projections of the second portion.

12 Claims, 4 Drawing Sheets

SYSTEM AND METHOD FOR FABRICATING STRUCTURES

INTRODUCTION

The present disclosure relates to a system and method for fabricating structures.

Automotive body panels are typically formed of metals, and are joined together by welding. Welding is a manufacturing or fabrication process that bonds materials such as metals or thermoplastics by causing coalescence, a process by which two separate units grow together, fuse, or merge into a single body. Panels may also be joined using adhesive or mechanical fasteners, such as bolts and rivets.

Many body panels and structures are formed with complex geometries or shapes. Fabrication of complex geometries requires the use of highly specialized tooling to form or remove materials during the process otherwise known as subtraction based manufacturing or fabrication processes. Subtraction fabrication processes may require the use of additional manufacturing materials and add time to the assembly of the body panels.

SUMMARY

A system and method for fabricating structures for a vehicle include a vehicle structure having a first portion and a second portion having a body cooperating with the first portion. The second portion include one or more projections extending from the body. A third portion operatively engages the one or more projections of the second portion. The second portion may be integrally formed with the first portion using an additive manufacturing process.

In one embodiment, the first portion may be a frame of a vehicle floor formed of metal and shaped by a stamping process. The second portion may be integrally formed with the first portion by an additive manufacturing process which could include selective laser sintering (SLS), stereolithography (SLA), multi jet modeling (MJM), fused deposition modeling (FJM), direct energy deposition (DED), and three-dimensional (3D) printing. The second portion may include a component cooperating with and providing support to the first portion of the vehicle structure. The third portion may include an elongate member including at least one opening sized to operatively engage the one or more projections of the second portion.

In another embodiment, a vehicle body includes a floor having a first portion. At least one component cooperates with the first portion. The at least one component includes a body and one or more projections extending from the body. An elongate member operatively engages the one or more projections of the at least one component. The at least one component may be integrally formed with the first portion of the floor using an additive manufacturing process.

The floor may include a first end, a second end and a generally horizontal frame incorporating the first portion extending between the first and second ends. The floor may also include a heel plate formed in the frame proximate the second end of the floor and a cowl extending generally vertically from the frame proximate the first end of the floor. The floor may be formed of metal and shaped by a stamping process.

The at least one component may be integrally formed with the first portion by the additive manufacturing process which could include selective laser sintering (SLS), stereolithography (SLA), multi-jet modeling (MJM), fused deposition modeling (FJM), direct energy deposition (DED), and three-dimensional (3D) printing. The at least one component cooperates with the first portion of the floor to provide structural support to the floor. The elongate member may include at least one opening sized to operatively engage the one or more projections of the at least one component.

In yet another embodiment, a method of fabricating a structure for a vehicle includes providing a first portion and forming a second portion to the first portion using an additive manufacturing process. The second portion includes a body formed to the first portion and one or more projections extending from the body. A third portion includes at least one opening. The third portion is positioned such that the at least one opening in the third portion may at least partially receive and engage the one or more projections of the second portion to secure the third portion to the second portion.

The step of providing a first portion may include forming a floor of the vehicle using a stamping process. The floor may be formed of metal and include a first end, a second end and a generally horizontal frame incorporating the first portion extending between the first and second ends.

The additive manufacturing process used to form the second portion to the first portion may include selective laser sintering (SLS), stereolithography (SLA), multi-jet modeling (MJM), fused deposition modeling (FJM), direct energy deposition (DED) and three-dimensional (3D) printing. The second portion may include at least one component integrally formed with the first portion to provide support to the first portion and secure the third portion relative to the first portion of the structure.

The third portion may include an elongate member having the least one opening sized to operatively engage the one or more projections of the second portion. The elongate member may be formed using an extrusion process.

The above features and advantages and other features and advantages of the present disclosure are readily apparent from the following detailed description of the best modes for carrying out the disclosure when taken in connection with the accompanying drawings.

DETAILED DESCRIPTION

Figure 1:
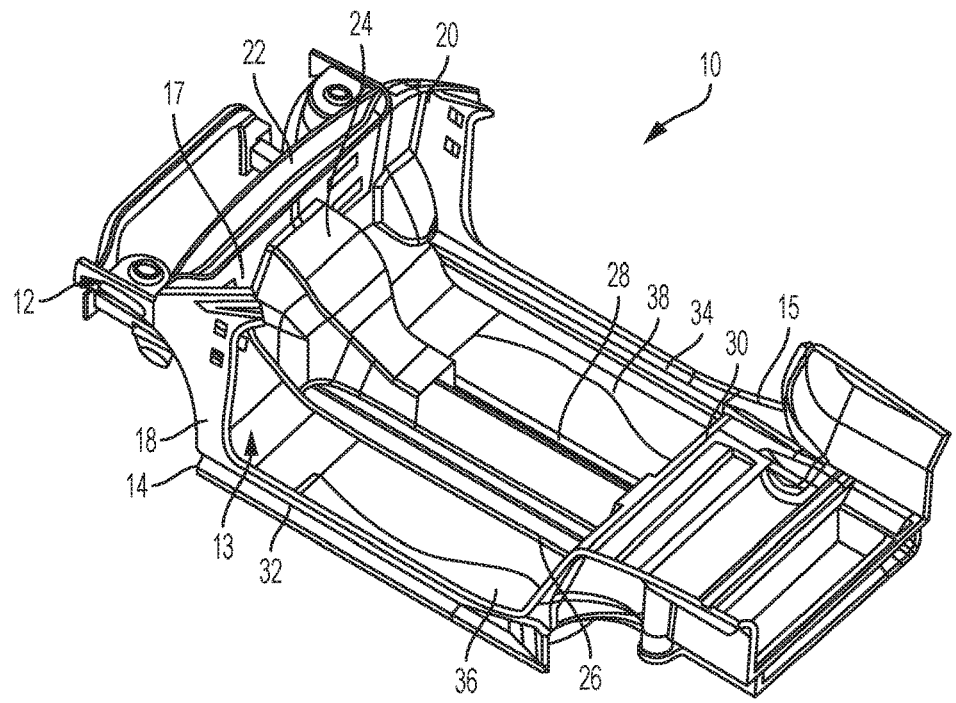
FIG. 1 is a perspective view of a vehicle body including a floor structure in accordance with the present disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Figure 2:
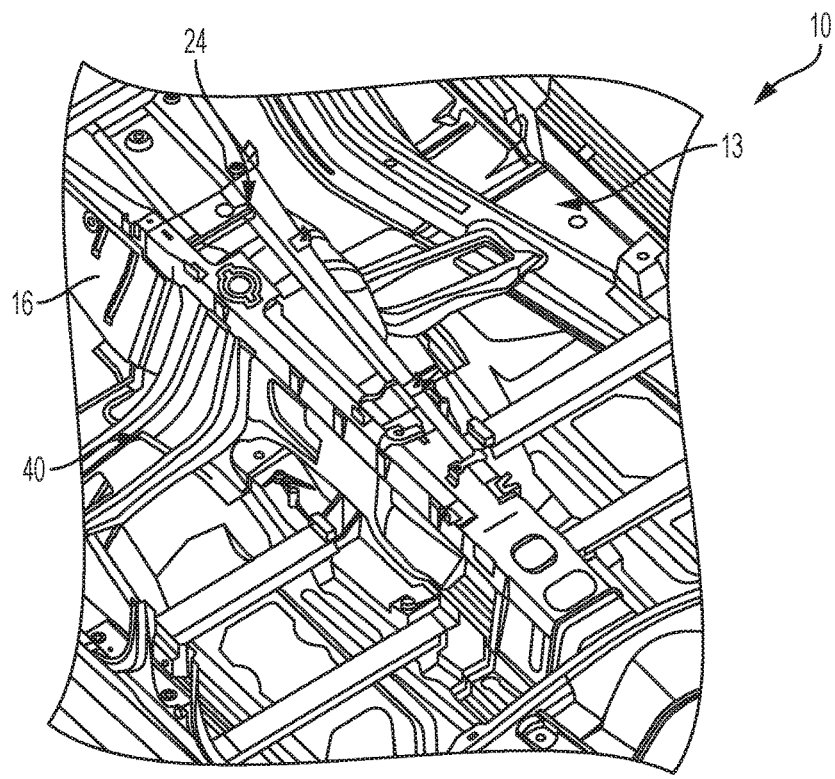
FIG. 2 is a perspective view of at least one component received by the floor of the vehicle body.
Figure 3:
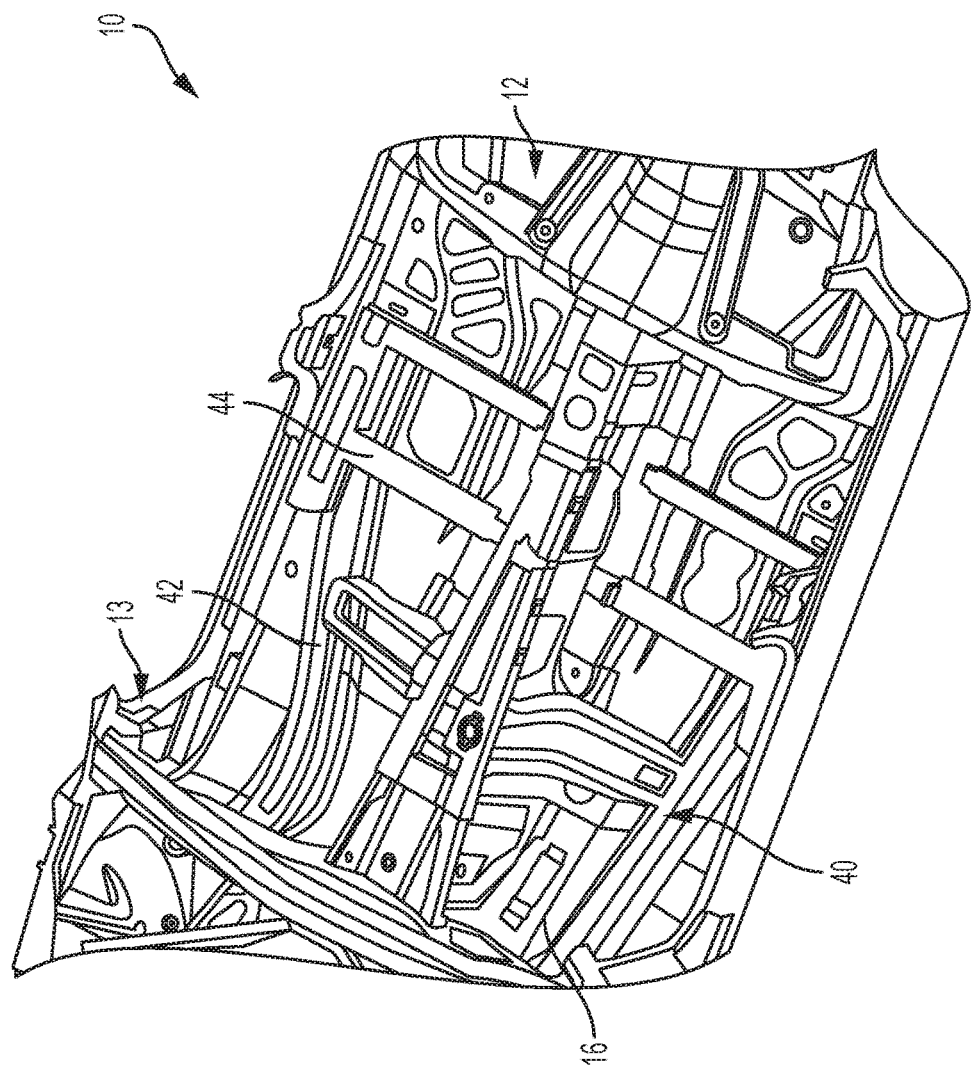
FIG. 3 is a perspective view of the vehicle body floor incorporating multiple support components.

Referring to the drawings, wherein like reference numbers correspond to like or similar components throughout the several Figures, FIGS. 1-3 illustrate a vehicle 10 having a body 12 including a floor 13. The floor 13 includes a first end 14, an opposing second end 15 and a generally horizontal frame 16 extending therebetween.

It is understood that the generally horizontal frame 16 of the floor 13 may include one or more features formed therein and may be formed by a variety of manufacturing techniques such as a stamping process or the like. The floor 13 may be incorporated in a variety of vehicles 10 including, but not be limited to, a commercial vehicle, industrial vehicle, passenger vehicle, aircraft, watercraft, train or any mobile platform. It is also contemplated that the vehicle 10 may be any mobile platform, such as an airplane, all-terrain vehicle (ATV), boat, personal movement apparatus, robot and the like to accomplish the purposes of this disclosure.

As shown in FIG. 1, the floor 13 includes a cowl 17 extending generally vertically from the generally horizontal frame 16 adjacent the first end 14 of the floor 13. Lateral cowl plates or sidewalls 18, 20 extend from end portions of the cowl 17 and cooperate with the frame 16. The cowl 17 may include a window pane mount 22 configured to receive a windshield or other member (not shown). The frame 16 of the floor 13 includes a channel or section 24 extending longitudinally in the surface 14 that at least partially cooperates with the cowl 17. Section 24 may be shaped to cooperate with and receive a portion of the transmission (not shown) of the vehicle 10. Tunnel edge surfaces 26, 28 are formed on either end of the channel or section 24 and extend generally longitudinally in the frame 16 of the floor 13 of the vehicle 10. It is contemplated that the section 24 may extend between the cowl 17 and terminate at a cross beam surface or heel plate 30 formed in the frame 16 proximate the second end 15.

The floor 13 may further include skirt surfaces 32, 34 extending generally longitudinally and parallel to tunnel edge surfaces 26, 28 between sidewalls 18, 20 of the cowl 17 and the heel plate 30. Skirt surfaces 32, 34 may be structurally joined with longitudinal chassis beams 36, 38 that run in the longitudinal direction of the frame 16 from the cowl 17 to the heel plate 30.

Referring now to FIG. 2, at least one component 40 is disposed on and cooperates with one or more areas of the frame 16 of the vehicle floor 13. The at least one component 40 may be formed from materials that are lightweight, including, but not limited to, polymers and fiber-reinforced plastics, aluminum and magnesium. Use of a lightweight construction material to form the at least one component 40 enables a reduction in the weight of the component 40 and, thereby, the vehicle body 12.

The at least one component 40 may be formed as support members such as cross beams, as referenced by numeral 42, brackets 44 or other known configurations as shown in FIG. 3. The at least one component 40 may be positioned on the frame 16 of the floor 13 to provide reinforcement and stiffening to the floor 13. In one non-limiting example, the at least one component 40 include a cross beam 42 that extends between tunnel edges surface 26 and skirt surface 32. Cross beam 42 may be assembled with the floor 13 or may be incorporated into the floor 13 as will be described in greater detail below.

Figure 4B:
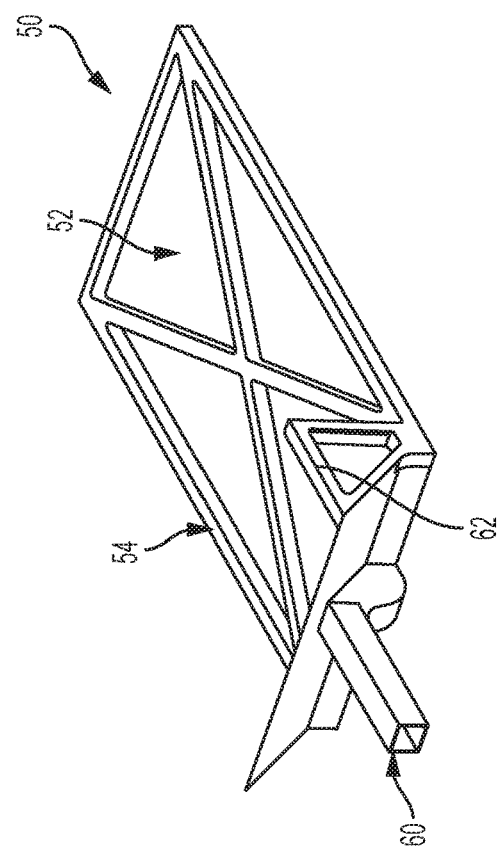
FIG. 4b is a schematic illustration of an elongate member received by a portion of the at least component.
Figure 4A:
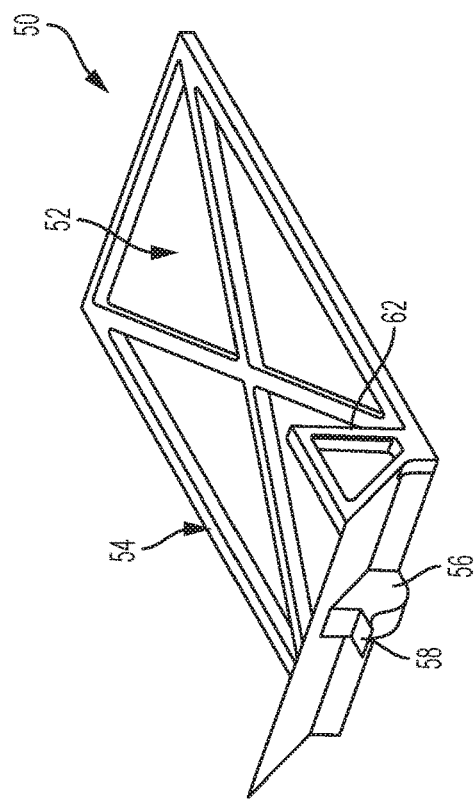
FIG. 4a is a schematic illustration of the fabrication of the vehicle structure including a component cooperating with a first portion of the vehicle.

Referring now to FIGS. 4A and 4B, a schematic illustration of one embodiment of the disclosure to fabricate a structure for a vehicle. It is understood that the vehicle structure is shown for illustrative purposes only as the disclosed process may be used to fabricate a variety of vehicle structures. In one non-limiting embodiment described above, the fabricated structure 50 may be the at least one component 40 received by the frame 16 of the floor 13 as shown in FIG. 2.

The vehicle structure is generally referenced by numeral 50. Structure 50 includes a first portion or section 52 formed of at least one material. For example, the section 52 may be formed from metals like steel, such as a galvanized low carbon steel or a galvanized high strength steel, or may be formed from polymers or the like. In one non-limiting embodiment, the section 52 is a workpiece formed of metal that is stamped or other manufacturing technique. In the alternative, the section 52 may be a metal workpiece that is not be subjected to any forming or bending processes.

A second portion or component 54 is formed of at least one second material, such as a polymer or the like and cooperates with a portion of the section 52. It is contemplated that the section 52 and component 54 may be formed from similar materials or may be formed from dissimilar materials, including, but not limited to the section 52 being formed from metal while the component 54 is formed from a non-metal such as thermoplastics or the like. It is also contemplated that the component 54 may be integrally formed with the first portion or section 52 or the component 54 may be formed and joined with the first portion of the section 52.

In one non-limiting embodiment, the component 54 is integrally formed using an additive manufacturing process on the first portion or section 52. Typical additive manufacturing processes may include, but are not limited to, selective laser sintering (SLS), stereolithography (SLA), multi jet modeling (MJM), fused deposition modeling (FJM), direct energy deposition (DED) and three-dimensional (3D) printing processes. An additive manufacturing process may be used to generate a three-dimensional solid object from a digital data model.

The additive manufacturing process creates components with complex geometric shapes or patterns from a digital model employing 3D digital data, such as solid models, and 3D product and manufacturing information and associated metadata providing specifications for formation of the component 54. The type of information typically included in a digital model for additive manufacturing is geometric dimensions and tolerances, identification component level materials, engineering configuration requirements and the like.

Additive manufacturing may include an additive process, where successive layers of material are laid down in different shapes. Additive manufacturing is distinct from machining techniques as machining techniques rely on the removal of material by methods subtractive machining processes such as cutting or drilling processes. As such, the use of an additive manufacturing process reduces material costs associated in creating parts with complex geometry compared to subtractive machining processes.

Formation of the component 54 with additive manufacturing processes significantly reduces the costs and complexity associated with the manufacture of the vehicle components that may require the using specialized tooling and dies to form complex shapes or features. Instead, vehicle structures may be formed with similar physical strength and durability characteristics by integrally forming the component 54 with complex geometric features using an additive manufacturing process to the section 52 having limited geometric features or no geometric features using a metal stamping or other manufacturing technique.

The component 54 may be a vehicle reinforcement member or body panel with a complex geometry, such as a structural brace or support bracket. As illustrated in FIGS. 2 and 3, component 54 may be a cross beam 42 integrally formed on the section 52 represented by the frame 16 of the floor 13. In this arrangement, the section represented by frame 16 may act as an armature such that the component represented by cross beam 42 is integrally formed on a surface of the section 52. It is contemplated that the component 54 may be formed by the additive manufacturing process to eliminate traditional joining techniques. For example, rather than fastening component 54 to the section 52 with mechanical fasteners, welding or adhesive joining, the component 54 is integrally formed on a portion of the section 52 with the additive manufacturing process.

Referring again to FIGS. 4A and 4B, the second portion or component 54 may include one or more projections 58 extending from the body 56 of the component 54. The one or more projections 58 may be configured to receive and support a third portion or elongate member 60. The elongate member 60 may be a longitudinally extending beam formed using an extrusion process. As with the section 52, the elongate member 60 may be formed with limited geometric features or without features to simplify the manufacturing process and reduce the amount of time and costs associated with manufacture. Projections 58 of the component 54 are shaped and sized to operatively engage at least one opening (not shown) of the elongate member 60 to secure the member 60 to the second component 54, and thereby, the section 52 and to eliminate common joining methods and mechanisms. In another non-limiting example, component 54 may be formed with the additive manufacturing process to join with the elongate member 60 and section 52.

Figure 5:
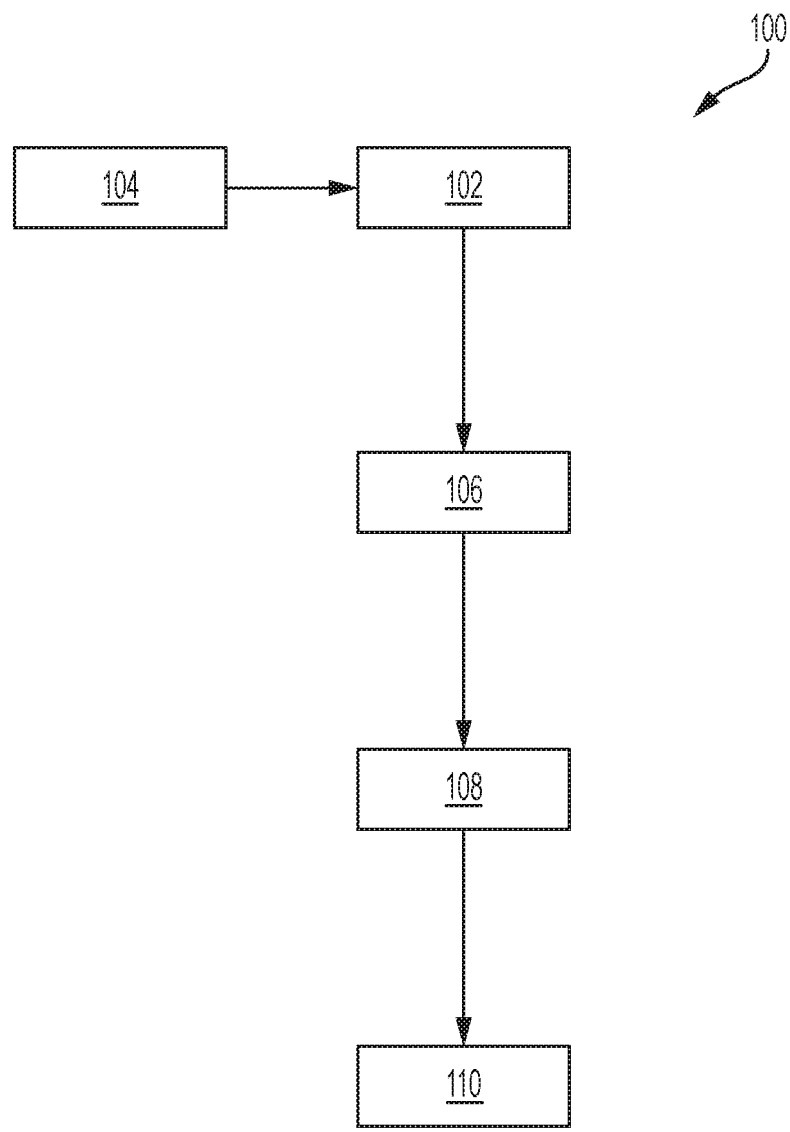
FIG. 5 is flowchart detailing the method of fabricating a vehicle structure in accordance with the present disclosure.

With additional reference to FIG. 5, a flowchart detailing the method 100 for fabricating structures is described in greater detail. The method 100 need not be applied in the specific order recited herein and it is further understood that one or more steps may be eliminated. The method begins at box or step 102, wherein a first portion or section is provided for assembly. In one non-limiting embodiment of the disclosure shown as box or step 104, the section may be metal and subjected to a forming process, such as a stamping process or the like to create one or more features in the section.

At box or step 106, a second portion of the structure may include at least one component cooperating with one or more surfaces of the section using an additive manufacturing process. It is contemplated that the one or more surfaces of the section provides an armature configured to receive the component as the component is formed by the additive manufacturing process.

In one alternative embodiment of the disclosure illustrated at step or box 108, the second component may be formed with any size, shape or thickness to receive and secure one or more components thereon. For example, as is shown in FIG. 4B, the second component may be designed to include one or more support brackets, identified by reference numeral 62 along with one or more projections 58.

At step or box 108, a third portion or elongate member is provided. In one embodiment, the elongate member is formed from an extrusion process and include a body having at least one opening formed therein sized to at least partially receive and engage the at least one projection 58 of the second portion or component 54.

At step or box 110, the third portion or elongate member 60 is positioned such that the at least one opening in the third portion may at least partially receive and engage the one or more projections of the second portion to secure the third portion to the second portion. Once assembled, the second portion or component acts as a fastener to join and secure the third portion or elongate member to the first portion or section without the use of traditional joining or fastening mechanisms and methods.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle structure comprising:
   a first portion, wherein the first portion further comprises a frame of a vehicle floor;
   a second portion having a body cooperating with the first portion and one or more projections extending from the body; and
   a third portion operatively engaging the one or more projections of the second portion,
   wherein the second portion cooperates with the first portion using an additive manufacturing process.

2. The vehicle structure of claim 1 wherein the frame is formed of metal and shaped by a stamping process.

3. The vehicle structure of claim 1 wherein the second portion is integrally formed with the first portion by the additive manufacturing process selected from the group consisting of selective laser sintering (SLS), stereolithography (SLA), multi jet modeling (MJM), fused deposition modeling (FJM), direct energy deposition (DED) and three-dimensional (3D) printing.

4. The vehicle structure of claim 3 wherein the second portion further comprises a component integrally formed and providing support to the first portion of the vehicle structure.

5. The vehicle structure of claim 1 wherein the third portion further comprises an elongate member including at least one opening sized to at least partially receive and engage the one or more projections of the second portion.

6. A vehicle body comprising:
   a floor having a first portion;
   at least one component cooperating with the first portion, the at least one component including a body and one or more projections extending from the body; and
   an elongate member operatively engaging the one or more projections of the at least one component,
   wherein the at least one component cooperates with the first portion of the floor using an additive manufacturing process.

7. The vehicle body of claim 6 wherein the floor further comprises a first end, a second end and a generally horizontal frame incorporating the first portion extending between the first and second ends.

8. The vehicle body of claim 7 wherein the floor further comprises a heel plate formed in the frame proximate the second end of the floor and a cowl extending generally vertically from the frame proximate the first end of the floor.

9. The vehicle body of claim 6 wherein the floor is formed of metal and shaped by a stamping process.

10. The vehicle body of claim 6 wherein the at least one component is integrally formed to the first portion by the additive manufacturing process selected from the group consisting of selective laser sintering (SLS), stereolithography (SLA), multi jet modeling (MJM), fused deposition modeling (FJM), direct energy deposition (DED) and three-dimensional (3D) printing.

11. The vehicle body of claim 6 wherein the at least one component cooperates with the first portion to provide structural support to the floor.

12. The vehicle body of claim 6 wherein the elongate member further comprises at least one opening sized to at least partially receive and engage the one or more projections of the at least one component.

* * * * *